(12) United States Patent
Jachim et al.

(10) Patent No.: US 7,393,129 B2
(45) Date of Patent: Jul. 1, 2008

(54) OPTICAL FILM ASSEMBLIES AND METHODS OF MAKING SAME

(75) Inventors: Anton F. Jachim, St. Paul, MN (US); John R. Mlinar, Coon Rapids, MN (US); Craig G. Markell, White Bear Lake, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 29 days.

(21) Appl. No.: 11/277,817

(22) Filed: Mar. 29, 2006

(65) Prior Publication Data

US 2007/0230218 A1 Oct. 4, 2007

(51) Int. Cl.
*F21V 7/04* (2006.01)

(52) U.S. Cl. .................................................. 362/618

(58) Field of Classification Search ................. 362/633, 362/618, 632, 634; 349/58, 61, 62, 65; 40/541, 40/564, 701, 710
See application file for complete search history.

(56) References Cited

U.S. PATENT DOCUMENTS

| | | | |
|---|---|---|---|
| 2,841,904 A * | 7/1958 | Jablon | 40/701 |
| 5,428,468 A | 6/1995 | Zimmerman et al. | |
| 6,160,663 A | 12/2000 | Merrill et al. | |
| 6,642,977 B2 | 11/2003 | Kotchick et al. | |
| 7,118,265 B2 * | 10/2006 | Cho | 362/606 |
| 7,125,157 B2 * | 10/2006 | Fu et al. | 362/632 |
| 7,224,416 B2 * | 5/2007 | Cha et al. | 349/60 |
| 2002/0149712 A1 * | 10/2002 | Kitamura et al. | 349/58 |
| 2004/0141103 A1 | 7/2004 | Kotchick et al. | |
| 2005/0046767 A1 | 3/2005 | Freking et al. | |
| 2005/0184970 A1 * | 8/2005 | Wegert et al. | 345/173 |

\* cited by examiner

*Primary Examiner*—Hargobind S Sawhney
(74) *Attorney, Agent, or Firm*—Scott A. Bardell

(57) ABSTRACT

In one aspect, a film assembly is disclosed comprising a first optical film having a tab disposed outside a first viewable area and a second optical film proximate and parallel to the first optical film, the second optical film having a slot formed outside a second viewable area; wherein the tab and slot are arranged to permit the first and second films to be moveably interlocked. In another aspect, an interlock arrangement for an optical film stack having at least a first and second optical film is disclosed comprising a penetrating member formed on the first film and a receiving member formed in the second film, wherein the film stack is moveably interlocked when the penetrating member is moveably secured in the receiving member. In another aspect, a method of assembling optical films is disclosed, the method comprising moveably interlocking two or more optical films to form a film assembly.

22 Claims, 4 Drawing Sheets

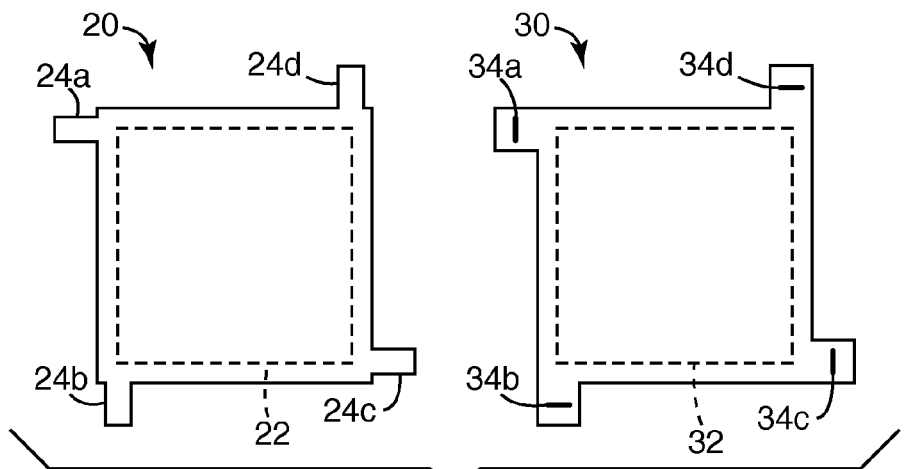
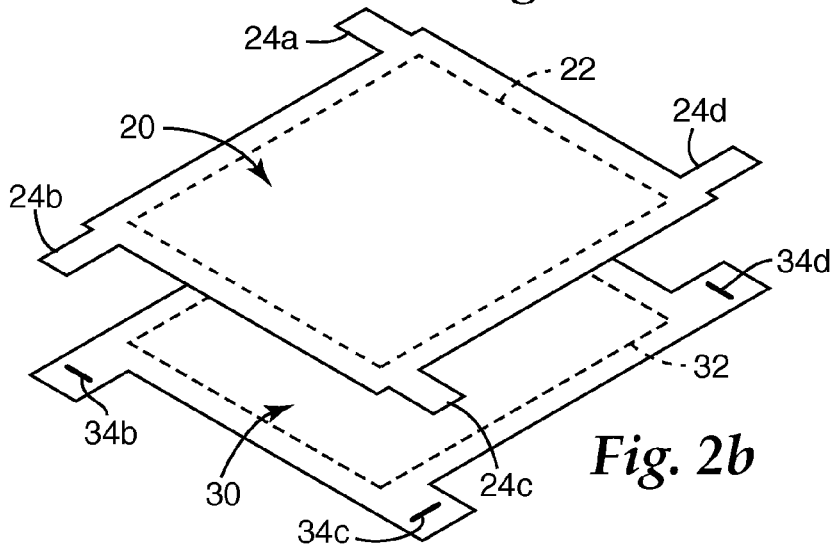
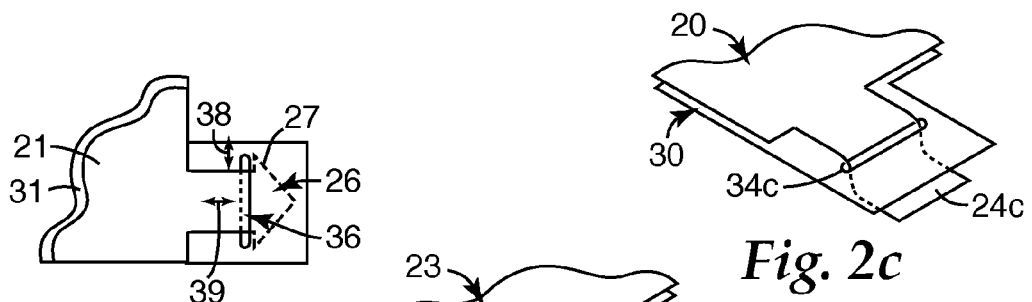
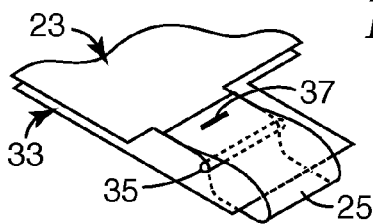
Fig. 2a
Fig. 2b
Fig. 3a
Fig. 2c
Fig. 3b

OPTICAL FILM ASSEMBLIES AND METHODS OF MAKING SAME

FIELD OF THE INVENTION

The present application relates to stacked optical film assemblies for use in optical displays and methods of making such optical film assemblies.

BACKGROUND

Optical displays such as backlit liquid crystal displays (LCDs) are used in a variety of applications including mobile telephones, personal digital assistants (PDAs), electronic game systems, laptop computers, computer monitors, and television screens. Optical films are used in such displays to provide a variety of functions, including light diffusion, light polarization and brightness enhancement. Typically, several such films are stacked together within an optical display in order to improve display performance and/or battery life.

Previous methods of packaging and handling stacked films include stacking the films one at a time into a display or bonding the films to each other prior to assembly in the display. Bonding methods include thermal welding, laser welding, solvent welding, crimping, or use of adhesives, as described for example in US Patent Publication 2005/0046767A (Freking et al., titled "Adhesive Stacking for Multiple Optical Films"). When stacked, the films are typically attached to the display frame.

SUMMARY

The presently disclosed film assemblies and methods of making such film assemblies allow the films in the film stack to move relative to each other in the film plane, in response to environmental changes. The ability to move relative to each other in the film plane, as the films expand and contract, reduces or eliminates warping and the undesired distortion associated therewith.

In one aspect, a film assembly is disclosed comprising a first optical film having a first viewable area and having a tab disposed outside the first viewable area; and a second optical film proximate and parallel to the first optical film, the second optical film having a second viewable area and a slot formed outside the second viewable area; wherein the tab and slot are arranged to permit the first and second optical films to be moveably interlocked.

In another aspect, an interlock arrangement for an optical film stack having at least a first and second optical film is disclosed. The interlock arrangement comprises a penetrating member formed on the first optical film and a receiving member formed in the second optical film, wherein the optical film stack is moveably interlocked when the penetrating member is moveably secured in the receiving member.

In another aspect, the invention provides a method of assembling optical films, comprising the steps of providing a first optical film having a first viewable area, placing a second optical film proximate and parallel to the first optical film, the second optical film having a second viewable area, wherein the second viewable area is substantially aligned with the first viewable area, and moveably interlocking the first optical film with the second optical film to form a film assembly.

The above summary of the present invention is not intended to describe each disclosed embodiment or every implementation of the present invention. These and other aspects of the present application will be apparent from the detailed description below. In no event should the above summaries be construed as limitations on the claimed subject matter. The claimed subject matter is defined solely by the attached claims, which may be amended during prosecution.

BRIEF DESCRIPTION OF THE DRAWINGS

The invention may be more completely understood in consideration of the following detailed description of various embodiments of the invention in connection with the accompanying drawings, where like reference numerals designate like elements. The appended drawings are intended to be illustrative examples and are not intended to be limiting. Sizes of various elements in the drawings are approximate and may not be to scale.

FIG. 2a schematically illustrates a film assembly according to one embodiment.

FIG. 2b schematically presents a perspective view of the film assembly of FIG. 2a.

FIG. 2c schematically presents a perspective view of one of the tab and slot pairs of the film assembly shown in FIG. 2b.

FIGS. 3a-b schematically illustrate alternative embodiments of a tab and slot pair.

FIG. 5b schematically illustrates a partial side view of the embodiment shown in FIG. 5a.

FIGS. 6b-6c schematically show a side view of the fastener of FIG. 6a.

FIG. 7b schematically shows a side view of the fastener of FIG. 7a.

Figure 1:
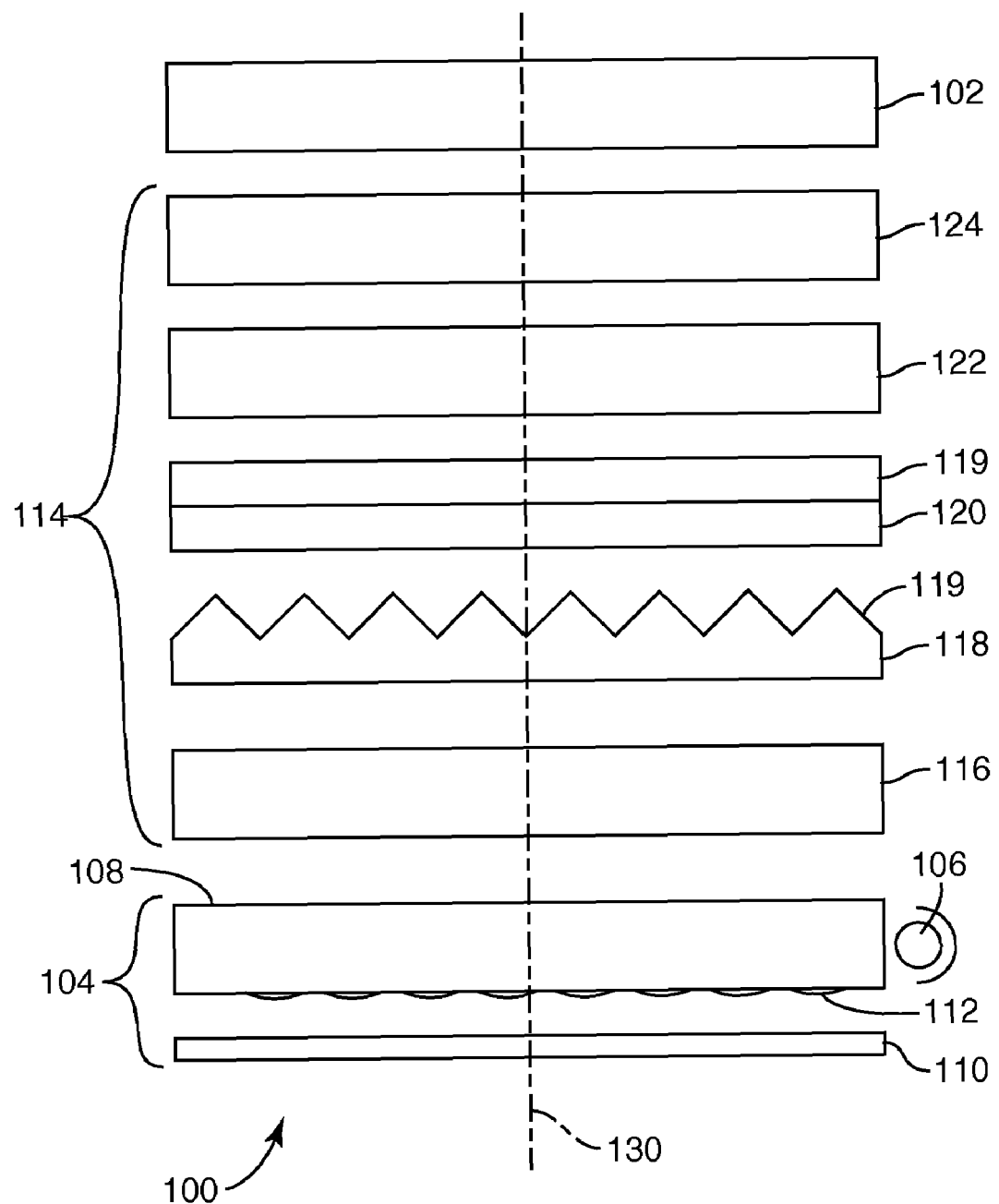
FIG. 1 is a schematically illustrates a display unit.

While the invention is amenable to various modifications and alternative forms, specifics thereof have been shown by way of example in the drawings and the detailed description. It should be understood, however, that the intention is not to limit the invention to the particular embodiments described. On the contrary, the intention is to cover modifications, equivalents, and alternatives falling within the spirit and scope of the invention as defined by the appended claims.

DETAILED DESCRIPTION

The present invention is applicable to displays, such as liquid crystal displays, and is particularly useful for reducing undesirable distortion of optical films in such displays.

A display system 100 is schematically shown in FIG. 1. The system includes an electronic display element 102, such as a liquid crystal display (LCD) panel, which is typically sandwiched between two glass layers. Furthermore, the display element 102 may include absorbing polarizers above and below the LCD panel to provide the polarization contrast typically required for producing a polarization-based image.

A backlight assembly 104 may be used as the primary light source for the display element 102, or may be used for providing light through the display element 102 when there is insufficient ambient light for the user to view the image formed by the display element 102. In one particular embodiment, backlight assembly 104 may include several elements such as a light source 106, a light guide 108, and one or more reflector layers 110. In many applications it is desirable that the total thickness of the display system be small. Accordingly, the light source 106 is commonly positioned to the side of the light guide 108, and the light guide 108 directs the light from the light source 106 up through the system 100 towards the display element 102. The light source 106 may be any suitable type of light source. In many applications, it is desirable to illuminate the display 100 with white light, in which case the light source 106 may be a fluorescent lamp, an array of light emitting diodes whose colors are mixed to produce white light, or the like.

In the illustrated embodiment, the light guide 108 is provided with diffusely reflecting regions 112 that direct light from the light guide 108 towards the display element 102. The light guide 108 may include other types of elements for directing light towards the display element 102, such as light extraction regions on the upper surface of the light guide 108 facing the display element. Light extraction features may also be provided on both the upper and lower surfaces of the light guide 108. It will be appreciated that the light guide 108 may be in the form of a slab, as illustrated, but may also be in other forms, for example a wedge. Also, other devices may be used to transmit light from the light towards the display element 102.

Other embodiments of backlight assembly may also be used. For example, the backlight assembly may be formed with an array of lamps positioned in a suitable reflective cavity, such as in a direct-lit backlight. The presently disclosed stacked optical film assemblies can be used with any of these, as well as other backlight designs.

A number of light management films are typically interposed between the backlight assembly 104 and the display element 102 in a light management film stack 114. The light management film stack 114 typically contains a number of optical films to control various optical characteristics of the light incident on the display element 102. For example, the light management film stack may include a first diffuser film 116. The first diffuser film may be used to help homogenize the intensity of the light passing up through the film stack 114.

Films 118 and 120 may be structured films, each having a row of prism-shaped ribs 119 running across its upper surface. The prism-shaped ribs help to direct the light towards the optical axis 130 of the system 100. The ribs 119 of the film 118 redirect the light in a direction parallel to the plane of the figure. The ribs of the film 120 are typically arranged non-parallel to those of the film 118. The ribs of the film 120 may be perpendicular to the ribs 119 of the film 118 so that the ribs of the film 120 redirect the light in a direction perpendicular to the plane of the figure. This may be referred to as a crossed-structure configuration. In another embodiment (not shown), the layers 118 and 120 may be substituted with a single structured optical film that redirects light received from the backlight assembly 104.

The stack 114 may also include a reflective polarizer layer 122. This layer is useful for recycling light from the backlight assembly 104 that is in the wrong polarization state for transmission through the display element 102 as image light. The light reflected by the reflective polarizer 122 may be diffusely reflected by the reflector 110, with some polarization mixing, so that at least a portion of the reflected light makes it through to the display element 102 with the correct polarization state for use as image light. In addition, a polarization converter, for example a quarter wave retarder layer may be used to convert the polarization of the light reflected from the reflective polarizer 122. The reflective polarizer 122 may be any suitable type of reflective polarizer, for example a multi-polymer layer film, a cholesteric polarizer or a wire-grid polarizer.

The stack 114 may also include another diffuser sheet 124, often referred to as the "cover sheet". The diffuser sheet 124 is typically a relatively weak diffuser. The diffuser sheets 116 and 124 may be useful for making the illumination of the display element 102 uniform to the viewer. It should be noted that depending on the actual system design, some of the elements represented by layers 116-124 may be missing, added to, or substituted with other functional elements.

With such a film stack 114, each of the discrete optical film layers 116-124 is typically individually inserted into the display frame during manufacture. As optical films become thinner and thinner, it becomes increasingly difficult to handle individual optical films. A number of free-standing stacked optical film assemblies have been proposed, however in each of the known assemblies the individual films are bonded together. Bonding creates an assembly in which the films are rigidly attached to each other.

During the normal course of using the optical display, the stacked films expand and contract as they respond to fluctuations in temperature or light intensity. Other sources of expansion and contraction include absorption, drying, curing, and phase changes. Films in such stacks may become warped because as the films expand and contract, they cannot move relative to each other. This is especially problematic when the optical films are made of different materials that expand at different rates and amounts. Since each film in a display has a specific optical function, even small amounts of warping can produce large optical effects resulting in undesirable defects in the display. Thus, resolving these problems would increase product output by increasing assembly efficiency, reducing the number of damaged films, and preventing warping both during production and during normal use of the display.

Known methods of attaching optical films include various bonding techniques, such as welding or gluing the films together. Even when applied to only the film edges, bonding physically constrains the films. As the films expand and contract, the films push and pull against each other at the glued or welded spots in the product plane, leading to undesirable distortion or warping in the viewing area of the films.

The presently disclosed stacked optical film assemblies avoid these problems by moveably interlocking the films while still providing a free-standing film assembly. The present application discloses films which are attached to each other in a way that allows the films to move relative to each other in the film plane during expansion and contraction. Such moveably interlocked film assemblies substantially reduce or eliminate warping and related distortions in the films, as they undergo environmental variations. The presently disclosed film assemblies also improve handling and alignment of the films during construction of the display.

FIG. 2a shows one embodiment of an optical film assembly. A first optical film 20 is provided having a first viewable area 22 and four tabs 24a-24d outside the first viewable area 22. A second optical film 30 is provided having a second viewable area 32 and four slots 34a-34d outside the second viewable area 32. The slots 34a-34d are distributed around the perimeter of the second film in the same pattern as the tabs 24a-24d of the first film to provide registration and proper alignment of the two films. In some embodiments, the tabs and slots can be asymmetrically distributed around the perimeters of the corresponding first and second films to avoid improper orientation of the films during assembly of the display.

During assembly, the first and second optical films, 20 and 30 respectively, are placed in close proximity and parallel to each other, as shown in FIG. 2b, such that the viewable areas 22 and 32 of the first and second films, 20 and 30 respectively, are in substantial alignment with each other. Then each of the four tabs 24a-d of the first film 20 can be inserted into a corresponding slot 34a-d of the second film 30. In a typical display unit, the film assembly is inserted into the display frame and aligned with the LCD panel so that it can be readily viewed.

FIG. 2c shows a partial view of one of the tab and slot pairs of FIG. 2b. The tab 24c of the first film 20 is inserted into the corresponding slot 34c of the second film 30.

The size of some or all of the slots 34a-d can be made somewhat larger than the tab ("toleranced") to allow for some movement or "play" of the two films in the film plane, so that after the films are attached, each film is allowed to expand and contract in its preferred direction as the environment changes. For example, the slots on the left side of the second film 30 (slots 34a and 34b) could be made tight, while the slots on the right side (slots 34c and 34d) could be made with some clearance. This arrangement allows each film to expand or contract horizontally or vertically without exerting in-plane forces on the other film, while maintaining the orientation of the films. The films in such a film assembly are said to be moveably interlocked.

Another example of a tab and slot pair is shown in FIG. 3a. The first film 21 contains a tab 26 which is arrow-shaped. The side tips 27 of the arrow help to lock the tab 26 into the slot 36 of the second film 31. The slot 36 is shown as having a tolerance which leaves room at the edges of the slot 36 for the first film 21 to move vertically relative to the second film 31, as shown by arrow 38. The first film 21 can also move horizontally with respect to the second film 31 because the tab 26 can slide in and out of the slot as needed, shown by arrow 39. The tip 27 of the arrow-shaped tab 26 prevents the tab from slipping entirely out of the slot 36. This arrangement allows each film to expand or contract horizontally or vertically without exerting in-plane forces on the other film, while maintaining the orientation of the films. The films in this embodiment are moveably interlocked.

An alternative embodiment of a tab and slot pair is shown in FIG. 3b. In this embodiment, the tab 25 of the first film 23 is similar to the tab 24c of FIG. 2c, but here the tab 25 is made longer so that it can be looped around the edge of the second film 33 and bonded onto itself at point 37. This arrangement allows each film to expand or contract horizontally or vertically without exerting in-plane forces on the other film, while maintaining the orientation of the films. In this embodiment, each film can move independently of the other during contraction and expansion, even though the tab 25 is bonded onto itself. Again, the films in this embodiment are moveably interlocked.

Figure 4A:
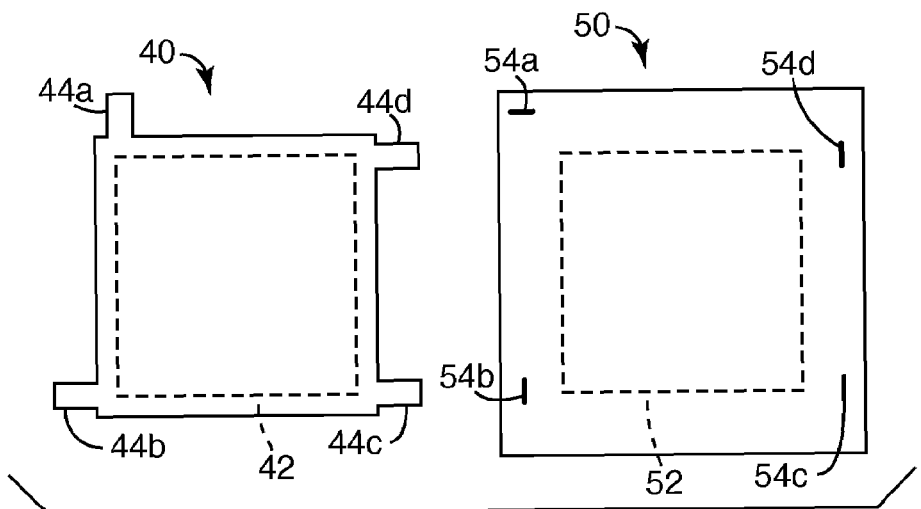
FIGS. 4a-4c schematically illustrate alternative embodiments of a film assembly.
Figure 4B:
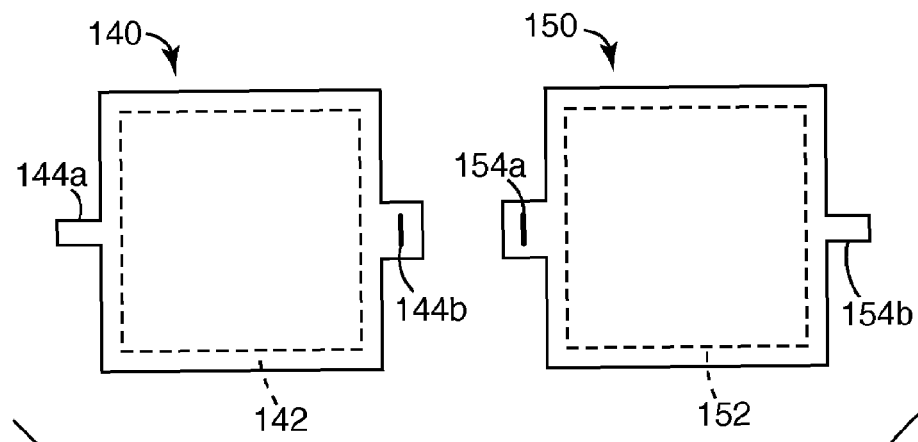
Figure 4C:
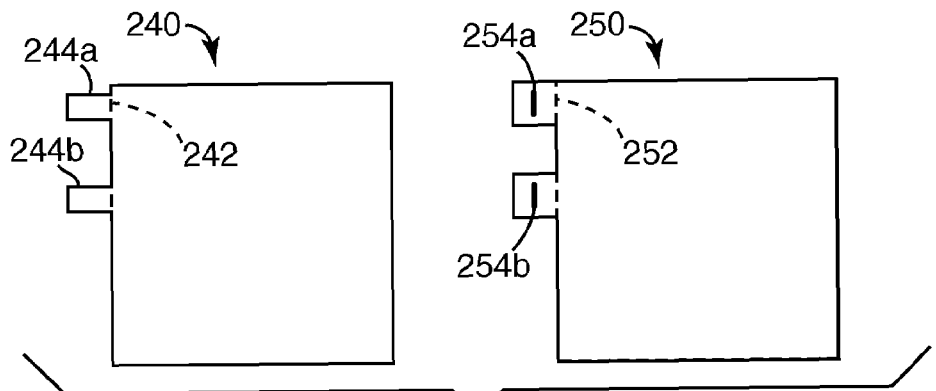

Additional embodiments are also contemplated, including without limitation those shown in FIGS. 4a-4c. FIG. 4a shows a first film 40 having a first viewable area 42 and four tabs 44a-44d. A second film 50 is shown having a second viewable area 52 and four slots 54a-54d. In this embodiment the second film 50 is somewhat larger than the first film 40. The slots 54a-d are disposed outside the viewable area 52, but inside the outer perimeter of the second film 50.

FIG. 4b shows another embodiment of a stacked film assembly in which the first film 140 has a tab 144a and a slot 144b while the second film 150 has a slot 154a and a tab 154b. The slots 144b and 154a are located in peripheral tabs of the first and second films 140 and 150, respectively. The tabs and slots are disposed on opposing sides of the films. The first film 140 has a first viewable area 142 while the second film 150 has a second viewable area 152. The tab 144a of the first film 140 and the slot 154a of the second film 150 form a tab and slot pair. Similarly, the slot 144b of the first film 140 and the tab 154b of the second film 150 form another tab and slot pair. During assembly, the tabs and slots in each tab and slot pair are moveably interlocked to form the film assembly.

FIG. 4c shows an alternative embodiment of a stacked film assembly. In this embodiment, the first film 240 has two tabs 244a-b and the second film 250 has two slots 254a-b, but here the tabs and slots are disposed asymmetrically around the perimeter of the film. The tabs 244a-b are disposed on one side of the first film 240 and the slots 254a-b are disposed on one side of the second film 250. In this embodiment, the first and second viewable areas 242 and 252 extend all the way to the perimeter of the films 240 and 250, respectively. This asymmetric arrangement of tabs and slots is particularly advantageous when one or both films are oriented films. Having the tabs asymmetrically disposed only on a single side of the film insures that the two films can be joined in only one orientation, thus avoiding misalignment during assembly of the stack.

In another aspect, an interlock arrangement for an optical film stack is disclosed. The film assemblies described above are formed by stacking two or more optical films. For example in FIG. 4b, the first optical film 140 has a penetrating member (tab 144a) while the second optical film 150 has a receiving member (slot 154a). The interlock arrangement allows the films in the optical film stack to be moveably interlocked when the penetrating member is moveably secured in the receiving member. In addition to the tab and slot of FIG. 4b, the penetrating and receiving members can have a variety of shapes and forms, as disclosed herein. Other penetrating and receiving member designs will be apparent to those skilled in the art, and are also contemplated, provided they allow the optical film stack to be moveably interlocked.

Figure 5A:
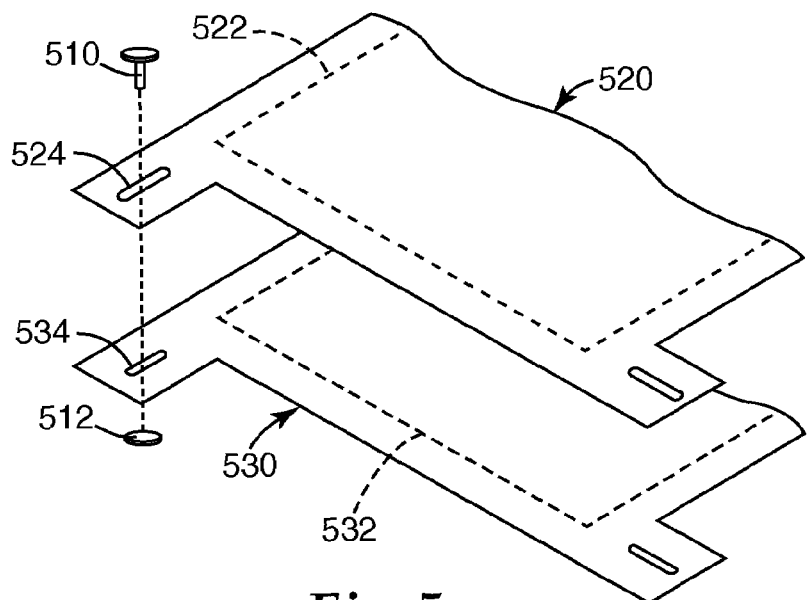
FIG. 5a schematically presents a perspective view of an alternative embodiment of a film assembly.

FIG. 5a shows an alternative embodiment of a moveably interlocked film assembly. As in the previous embodiments, here two or more films can be attached while still allowing the films to expand and contract independently of each other. In FIG. 5a, a first optical film 520 is provided having a first viewable area 522. A second optical film 530 is placed proximate and parallel to the first film 520. The second optical film 530 has a second viewable area 532. Each film has slots 524 and 534 located outside the viewable area (522 and 532, respectively) of the film. As described above, the slots can be disposed in peripheral tabs outside the perimeter of the film, or can be disposed inside the perimeter of the film but outside the viewable area. Other variations are also contemplated. In this embodiment, the films are moveably interlocked using fasteners 510.

Figure 5B:
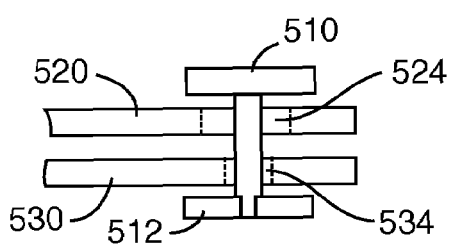

FIG. 5b shows a partial view of the assembled stack of optical films of the embodiment shown in FIG. 5a. In FIG. 5b, a fastener 510 is shown inserted through the slots 524 and 534. One of the slots (524) is made larger (toleranced) than the other slot (534) to allow the first film 520 to move relative to the second film 530. A fastener cap 512 is placed on the end of the fastener after insertion through the films, to hold the fastener 510 in place.

Figure 6A:
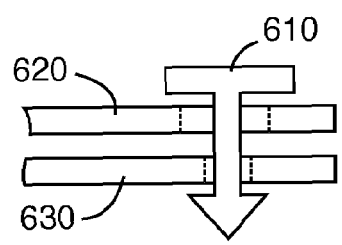
FIG. 6a schematically shows an alternative embodiment of a fastener.
Figure 6B:
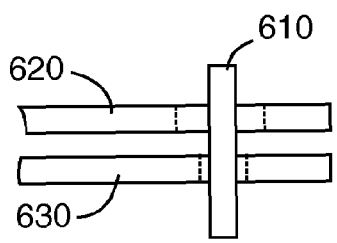
Figure 6C:
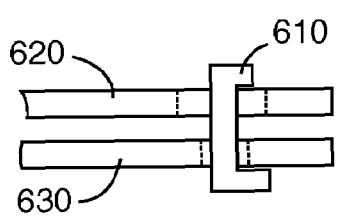

FIG. 6a schematically shows an alternative embodiment of a fastener 610 that could be used in a film assembly. The fastener 610 can be made out of film similar in thickness to the optical films being assembled. The film used to make the fastener 610 need not have the optical properties of the first and second (or any additional) optical films. The fastener 610 can be cut in the shape of an arrow as shown. FIG. 6b schematically shows a side view of the fastener 610 of FIG. 6a. A flat fastener, such as the fastener 610 of FIGS. 6*a-b* may be desirable for applications where it is important to keep the overall film stack thickness to a minimum. FIG. 6*c* shows the fastener 610 inserted through the slots 624 and 634 of the first and second optical films 620 and 630, respectively, but in a final step the ends of the fastener 610 have been crimped or bent to lie in the plane of the optical films.

Figure 7A:
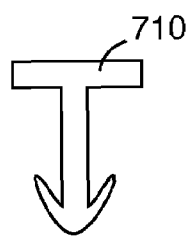
FIG. 7a schematically shows another embodiment of a fastener.
Figure 7B:
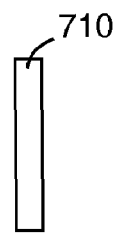
Figure 7C:
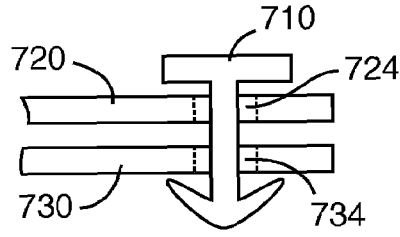
FIG. 7c schematically shows the fastener of FIGS. 7a-7b in a film assembly.

FIG. 7*a* schematically shows another embodiment of a fastener 710 that can be used in a film assembly. The fastener 710 can be injection molded into a shape of a snap rivet having an arrow tip as shown in FIG. 7*a*, where the side lobes of the arrow are allowed to flare out. FIG. 7*b* schematically shows a side view of the fastener 710 of FIG. 7*a*. The side profile of the fastener 710 can be made flat, as shown. FIG. 7*c* illustrates the fastener 710 inserted through the slots 724 and 734 of the first and second optical films 720 and 730, respectively.

Additional fastener designs are also contemplated. For example a fastener can be shaped as a loop and inserted through a pair of slots. The loop can be made of the same material as one of the films, a similar material (e.g. non-optical polymeric film), or a different material. Other fastener designs known in the art, including pins, rivets, snap rivets, and the like, are also contemplated.

The presently disclosed film assemblies and methods of making same allow the films in the film stack to move in response to environmental changes. The ability to move relative to each other in the film plane, as the films expand and contract, reduces or eliminates warping and the undesired distortion associated therewith.

The films and film assemblies described herein are depicted generically for simplicity, but can include conventional design features as known in the art. For example, the films can be structured or smooth, oriented or unoriented, polarizing or non-polarizing, and so on. Similarly, the film assembly can include additional components or layers (e.g. protective layers). The films can be formed into the shapes shown by conventional cutting methods, such as die cutting, plotter cutting, or laser cutting. Although depicted as generally rectangular in shape, the films can be formed into any shape suitable for a particular display.

An arrangement of two films is shown for simplicity, but film stacks comprising three or more films are also contemplated. For example, a third film could be provided having slots similar to the slots of the films described above. In the arrangement having tabs and slots, the tabs can be inserted through both the second and third film. In the arrangement using slots and fasteners, the third film could be placed between the first and second films and the fasteners can be inserted through each group of three corresponding slots. Alternatively, the third film could be made without any slots and could be free-floating between the first and second films. For example, the third film can have portions outside its viewable area notched out in the places corresponding to the tabs and/or slots of the other films.

While the invention is amenable to various modifications and alternative forms, specifics thereof have been shown by way of example in the drawings and the detailed description. It should be understood, however, that the intention is not to limit the invention to the particular embodiments described. On the contrary, the intention is to cover modifications, equivalents, and alternatives falling within the spirit and scope of the invention as defined by the appended claims.

What is claimed is:

1. A film assembly, comprising:
    a planar first optical film having a first viewable area defining a plane and having a tab disposed outside the first viewable area and extending within the plane;
    a second optical film proximate and parallel to the first optical film, the second optical film having a second viewable area and having a slot formed outside the second viewable area;
    wherein the tab and slot are arranged to permit the first and second optical films to be moveably interlocked by bending the first optical film in non-planar manner.

2. The film assembly of claim 1, wherein the tab is one of a plurality of tabs and wherein the slot is one of a plurality of slots.

3. The film assembly of claim 2. wherein the tabs are asymmetrically distributed.

4. The film assembly of claim 1, wherein first optical film includes a plurality of tabs disposed outside the first viewable area.

5. The film assembly of claim 1, wherein the first optical film includes at least one tab and at least one slot formed outside the first viewable area.

6. The film assembly of claim 1, wherein at least one of the optical films is oriented.

7. The film assembly of claim 1, further comprising a third optical film disposed between the first and second optical films.

8. A display comprising the film assembly of claim 1.

9. The film assembly of claim 1, wherein the tab extends from a peripheral edge of the first optical film.

10. An interlock arrangement for an optical film stack having at least a first and second optical film, the interlock arrangement comprising:
    a penetrating member formed on the first optical film and extending coplanar with the first optical film;
    a receiving member formed in the second optical film;
    wherein the optical film stack is moveably interlocked when the penetrating member is bent in non-planar manner, and is moveably secured in the receiving member.

11. The interlock arrangement of claim 10, wherein the penetrating member is a tab.

12. The interlock arrangement of claim 11, wherein the receiving member is a slot formed in one of the optical films.

13. The interlock arrangement of claim 10, wherein the penetrating member is one of a plurality of penetrating members and wherein the receiving member is one of a plurality of receiving members.

14. The interlock arrangement of claim 10, wherein first optical film includes a plurality of penetrating members.

15. The interlock arrangement of claim 10, wherein the first optical film includes at least one penetrating member and at least one receiving member.

16. The interlock arrangement of claim 10, wherein at least one of the optical films is oriented.

17. A film assembly comprising the interlock arrangement of claim 10.

18. The interlock arrangement of claim 10, wherein the penetrating member extends from a peripheral edge of the first optical film.

19. A method of assembling optical films, comprising the steps of:
    providing a first optical film having a first viewable area defining a plane;
    placing a second optical film proximate and parallel to the first optical film, the second optical film having a second viewable area, wherein the second viewable area is substantially aligned with the first viewable area; and providing a tab disposed outside the first viewable area and extending within the plane of the first optical film bending the tab in a non-coplanar manner with respect to the first and second optical and inserting the bent tab films into a slot formed in the second optical film outside the second viewable area, wherein the first and second optical films are movable relative to each other in a direction parallel with the first viewable area when moveably interlocked as the film assembly.

20. The method of claim 19, wherein the step of moveably interlocking includes inserting a plurality of tabs disposed outside the first viewable area of the first optical flint into a corresponding plurality of slots formed in the second optical film outside the second viewable area.

21. The method of claim 20, wherein the providing step includes providing the first optical film with a tab, the tab arranged extending from a peripheral edge of the first optical film.

22. The method of claim 17, further comprising looping the tab over the second optical film and bonding the tab onto itself.

* * * * *

UNITED STATES PATENT AND TRADEMARK OFFICE
CERTIFICATE OF CORRECTION

PATENT NO. : 7,393,129 B2
APPLICATION NO. : 11/277817
DATED : July 1, 2008
INVENTOR(S) : Anton F. Jachim It is certified that error appears in the above-identified patent and that said Letters Patent is hereby corrected as shown below:

Column 8,
Line 14, delete "2." and insert -- 2, --, therefor.

Column 10,
Line 1, delete "flint" and insert -- film --, therefor.

Signed and Sealed this

Twenty-fourth Day of March, 2009

JOHN DOLL
*Acting Director of the United States Patent and Trademark Office*